United States Patent [19]

Möckesch et al.

[11] Patent Number: 4,548,321

[45] Date of Patent: Oct. 22, 1985

[54] FOIL BAG

[75] Inventors: Erich Möckesch, Heilbronn; Hans-Herbert Noack, Öhringen, both of Fed. Rep. of Germany

[73] Assignee: Bier-Drive AG, Chur, Switzerland

[21] Appl. No.: 510,294

[22] Filed: Jul. 1, 1983

[30] Foreign Application Priority Data

Jul. 7, 1982 [EP] European Pat. Off. ........ 82106081.1

[51] Int. Cl.⁴ ................... B65D 85/00; B65D 90/04; B65D 90/08
[52] U.S. Cl. ................................ 206/525; 150/55; 220/85 B; 220/450; 220/460; 220/470; 383/107; 383/109
[58] Field of Search .............. 220/470, 461, 460, 404, 220/403, 85 B, 450; 383/66, 107, 111, 907, 105, 2, 109, 119; 229/3.5 MF; 206/525; 150/55

[56] References Cited

U.S. PATENT DOCUMENTS

| | | | |
|---|---|---|---|
| 1,611,877 | 12/1926 | LeBlans | 383/66 X |
| 2,989,757 | 6/1961 | Friedlander et al. | 220/461 |
| 2,991,815 | 7/1961 | Pfeiffer | 383/96 X |
| 3,085,708 | 4/1963 | Dosker | 220/461 X |
| 3,244,576 | 4/1966 | Swartz | 383/66 X |
| 3,593,767 | 7/1971 | Smith | 383/105 X |
| 3,946,780 | 3/1976 | Sellers | 383/66 |
| 4,284,672 | 8/1981 | Stillman | 229/3.5 MF X |

FOREIGN PATENT DOCUMENTS

| | | |
|---|---|---|
| 2736272 | 2/1979 | Fed. Rep. of Germany . |
| 2758189 | 6/1979 | Fed. Rep. of Germany ...... 220/470 |
| 2902291 | 7/1980 | Fed. Rep. of Germany . |
| 759011 | 1/1934 | France .................................. 383/66 |
| 448603 | 6/1936 | United Kingdom .................... 383/2 |

Primary Examiner—Allan N. Shoap
Attorney, Agent, or Firm—Fitzpatrick, Cella, Harper & Scinto

[57] ABSTRACT

A double-walled or quadruple-walled foil bag (8) for receiving a liquid, more particularly beer, which is to be arranged in a preferably spherical pressure tank, consists of flat, superposed, circular or polygonal foil pieces (2a–2c) which are welded together at the edge. The foil pieces which form a foil bag half (8a, 8b) are provided in the central area with a connecting piece (5) which penetrates them. The foil pieces, which form the double or quadruple wall, are preferably cut out of a flattened, commercially available foil tube. In order to test the finished foil bag for imperviousness, only an annular peripheral area which runs next to the weld seam (6) and which is connected via a connecting channel with a central area surrounding the connecting piece (5) is inflated. The foil bag (8), which is to be introduced into a cover, is previously folded in the form of an umbrella so that the foil bag half (8b) which does not contain the connecting piece (5) is inserted into the foil bag half (8a) which contains the connecting piece (5).

5 Claims, 12 Drawing Figures

FOIL BAG

The invention relates to a foil bag, preferably of plastics material, for receiving a liquid, more particularly beer, within a pressure tank.

Formerly, and also still partly today, casks were filled by the manufacturer with carbon dioxide-containing drinks, especially beer, and then delivered. At the place of consumption, the casks are tapped and, after they have been emptied, they are sent back to the manufacturer. The latter cleanses the casks and fills them afresh. However, transportation of the casks and cleansing is time-consuming and expensive. Furthermore, cleansing is not always carried out to the desired extent, with the result that the sterility of the casks, which is especially necessary for the stability and quality of beer, is not guaranteed.

According to German Patent 27 36 272, therefore, a filling method was introduced wherein at the places of consumption, for example in the cellars of inns, stationary, preferably spherical, pressure tanks are installed. The carbon dioxide-containing drink is conveyed there by the manufacturer by means of tankers and is introduced into the pressure tanks. However, in order that the carbon dioxide-containing drink does not come into contact with the inside wall of the pressure tank, before each filling operation a foil bag is inserted into each pressure tank, into which bag the liquid is introduced via a valve and a filler connection provided on the foil bag. The foil bag is firstly folded up and is enclosed by a sheath which is suspended in the top region of the pressure tank. The drink is introduced into the foil bag from below and, as a result, the foil bag is gradually withdrawn from the sheath. This stops the foil bag from lying in folds against the wall of the pressure tank where the weight of the liquid may otherwise prevent its unfolding. By then allowing a compressed gas to act on the outside of the foil bag, i.e. in the space between the foil area and the inside wall of the pressure tank, the foil bag can be emptied again for the purpose of tapping the carbon dioxide-containing drink and by regulating the pressure of the compressed gas it is possible to tap at constant pressure, irrespective of the fullness or otherwise of the filling bag.

The method described above has proved extraordinarily successful and increasingly is taking the place of the casks formerly used. Each time the pressure tank is freshly filled, the foil bag must be changed. Until now, for the purpose of matching most fully the spherical shape of the pressure tank, foil bags (DE-OS 29 02 291) welded together from three parts, namely a cylindrical central section and two cup-shaped end sections, have been used. The cylindrical central section is produced from a flat, rectangular foil piece by placing together and welding the end edges accordingly. This is still relatively simple. Producing the cup-shaped end sections, on the other hand, is less simple. These can be made only in moulding presses which are produced specifically for this purpose. In order to guarantee its imperviousness, which is absolutely essential, the foil bag is constructed with two or even four walls. The filling connection penetrates one of the two cup-shaped end sections. Testing for imperviousness used to be carried out by inflating the foil bag with air and by keeping it in the inflated state for a certain length of time in order to be able to determine any pressure drop occurring more particularly as a result of leakages at the weld seams. In order to introduce a foil bag into a cover, the foil bag is firstly folded up, and then the end which is opposite the filling connection is bent over and placed against the central section. This thereby produces in the area of this turned back end section a thickening compared with the remaining region, which occasionally impedes the foil bag from emerging steadily from the cover.

The object underlying the invention is primarily to form, more simply and therefore less expensively, a foil bag of the type initially described.

This object is achieved by a foil bag consisting of at least two flat, disc-shaped foil pieces which are joined at the edge, preferably by welding.

Using the basic inventive idea, a double-walled foil bag can consist of four flat, disc-shaped foil pieces which are joined at the edge, preferably by welding. Accordingly, a quadruple-walled foil bag must consist of eight disc-shaped foil pieces.

It is advantageous, more particularly when the foil sack is to be inserted into a spherical pressure tank, to form the disc-shaped foil pieces as a circle or a polygon. Polygonal foil pieces are simpler to cut out on account of their straight edges. A simpler welding apparatus can also be used for polygonal foil pieces, with which the straight edges can be welded one after the other.

In order to introduce the liquid into the foil bag and to be able to draw it from the foil bag, then, as known, the foil bag can be provided with a connecting piece which penetrates the wall. In the present case it is advantageous to arrange the connecting piece approximately in the centre or in the central area of the foil piece, or of the foil pieces, forming one half of the foil bag. In the case of circular foil pieces the connecting piece should advantageously be provided in the centre of the foil pieces.

The invention further relates to a method of producing a foil bag of the type described above, which is particularly suitable for double- and quadruple-walled foil bags. To produce double-walled foil bags, the two flat, disc-shaped foil pieces which form one foil bag half, respectively can be cut or punched out of a commercially available, flattened foil tube, then the two flat, disc-shaped foil pieces which form the other foil bag half and which are obtained in the same way can be placed on the first-mentioned foil pieces, and, finally, the superposed foil pieces can be welded at the edge. For quadruple-walled foil bags the four foil pieces which form one foil bag half, respectively are punched out of two superposed foil tubes and are welded with the four further foil pieces which are obtained in the same way.

In order to produce the double-walled foil bag for a spherical pressure tank, which is described above, the following steps can be provided:

(a) firstly, there is drawn off from a foil store, preferably a roll, on which a single foil, a double foil or a flattened foil tube is wound, a doubly superimposed length of the single foil, or a length of the double foil or of the foil tube;

(b) a hole is then made, preferably by punching, in the central area of the drawn off length;

(c) the connecting piece is then attached to the hole area of the drawn off length;

(d) after step (a), (b) or (c), or simultaneously with step (b) or (c), the drawn off length is severed;

(e) then, repeating step (a), a further length is drawn off from the foil store or roll;

(f) this additional drawn off length is then welded with the previously drawn off length along a closed curve which defines the circumference of the flat, disc-shaped foil pieces;

(g) simultaneously, or subsequently, the flat, disc-shaped foil pieces are cut out of the drawn off lengths by a cut which runs next to the weld line.

The method just described can advantageously also be completed by the additional drawn off length being severed after step (e) or (f) or simultaneously with step (f) or (g).

In order to produce a quadruple-walled foil bag for a spherical pressure tank, the following steps can be provided:

(a) firstly, there is drawn off from a foil tube, preferably a roll, on which a single foil, a double foil, a foil tube or a quadruple foil is wound, a quadruply superimposed length of the single foil, a doubly superimposed length of the double foil or of the foil tube or a length of the quadruple foil;

(b) a hole is then made, preferably by punching, in the central area of the drawn off length;

(c) the connecting piece is then attached to the hole area of the drawn off length;

(d) after step (a), (b) or (c), or simultaneously with step (b) or (c), the drawn off length is severed;

(e) then, repeating step (a), a further length is drawn off from the foil store or the roll respectively;

(f) this additional drawn off length is then welded with the previously drawn off length along a closed curve which defines the circumference of the flat, disc-shaped foil pieces;

(g) simultaneously, or subsequently, the flat, disc-shaped foil pieces are cut out of the drawn off lenghts by a cut which runs next to the weld line.

Furthermore, the production process can include testing the finished foil bag for its imperviousness. In order to save time which is required for the complete inflation of the finished foil bag, which was previously employed, it is now proposed to inflate the foil bag with compressed air only at its annular peripheral area which extends next to the weld seam. Independent, inventive importance is attached to this idea. It is also applicable to foil bags of the conventional kind. Inflation only of the peripheral area can be achieved by compressing the central area of the foil bag during inflation to at least a channel-like connecting area which extends from the connecting piece which is located approximately in the centre to the annular peripheral area.

To complete the production process described above, it is further proposed that the pressure-tested foil bag is folded in the empty state in the form of an umbrella; the foil bag half which is not provided with the connection piece is inserted into the foil bag half which is provided with the connecting piece, and that the foil bag, which is thus folded up, is introduced into a tubular cover. Independent, inventive importance is likewise attached to this idea. It is associated with the advantage that the folded foil bag is now the same thickness throughout, and therefore it can safely be guaranteed that the foil bag will emerge steadily from the cover when the foil bag is filled.

The invention is described below with reference to the drawings.

Figure 11:
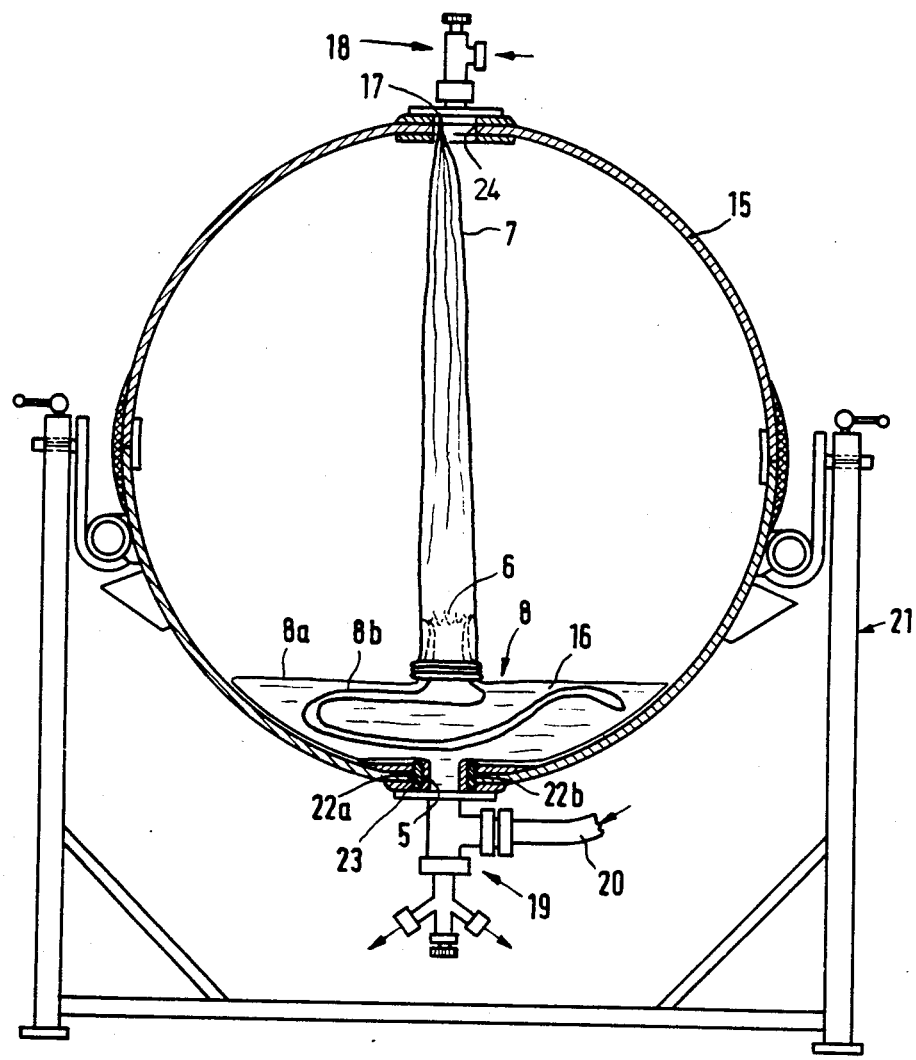
FIG. 11 shows a section through a spherical pressure tank with suspended foil bag which is partly filled with liquid and pulled out of the sheath.

FIG. 11 shows a spherical pressure tank 15 which is rotatably arranged about a horizontal axis on a frame 21. The pressure tank 15 is provided with an opening 21 at the top and with an opening 23 at the bottom. The opening 21 is sealed with a fitting 18 for introducing compressed gas. The opening 23 is provided with a fitting 19 for introducing beer and also for emptying. The beer is introduced into the fitting 19 via a line 20.

There is inserted into the opening 23 a connecting piece 5 which forms the open end of a foil bag 8 which, as will be explained later, consists of two foil bag halves 8a, 8b which are interconnected by a weld seam 6. The foil bag 8 is double-walled but this is not discernible in FIG. 11. The connecting piece 5 is retained in the opening 23 by means of two ring halves 22a, 22b which can be taken apart. The foil bag 8 is still partly located in a tubular sheath 7 which is secured by its top end to a button 17 which is located on the compressed gas fitting 18.

FIG. 11 shows the stage wherein beer is introduced under pressure into the foil bag 8 via the line 20 and the fitting 19 through the connecting piece 5. The foil bag 8 is thereby drawn successively out of the sheath 7. The sheath 7 has the task of stopping the foil bag from forming folds, against the inside wall of the pressure tank, on which the weight of the beer 16 would press, thereby preventing the unfolding of the bag.

When in FIG. 11 the foil bag 8 is completely filled with beer, then the beer 16 completely, or almost completely, fills the interior space of the pressure tank 15, without the beer 16 coming into contact with the inside wall of the pressure tank 15. The beer 16 is drawn from the pressure tank again, as indicated, via the fitting 19. Compressed gas, which is introduced into the fitting 18, ensures that the tapped beer can always be drawn at constant pressure.

Figure 1:
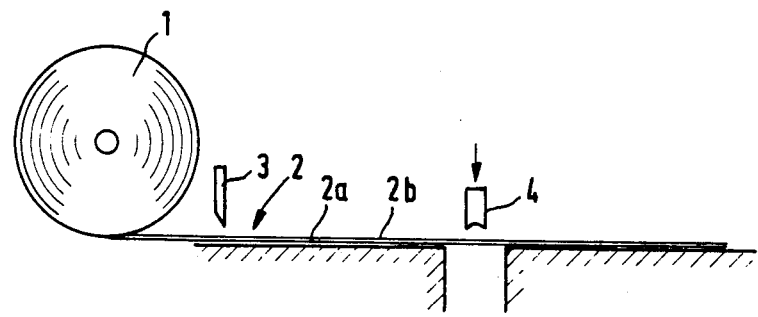
FIGS. 1 to 3 show three successive stages in the production of a double-walled foil bag.
Figure 2:
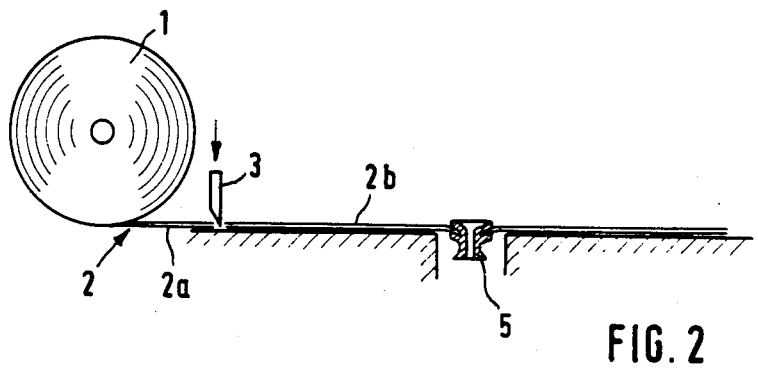
Figure 3:
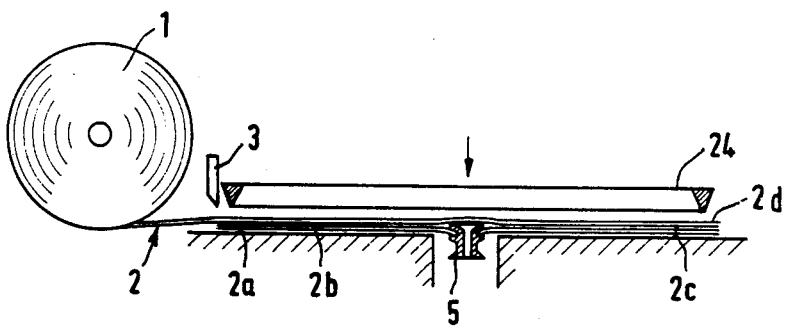

The manufacture of a double-walled foil bag is now to be described with reference to FIGS. 1 to 10. According to FIG. 1, a flattened, plastics foil tube 2 is wound on a supply roll 1. A piece of the foil tube 2 is drawn off from the supply roll 1. The bottom layer of the flattened tube 2 is denoted with 2a, and the top layer is denoted with 2b. A hole is punched approximately in the central area of the drawn off foil tube length by means of a punch 4. Simultaneously, or subsequently, the drawn off foil tube length is severed from the flattened foil tube 2 which is still on the supply roll 1 by means of a cutting device 3 which is represented only schematically. Likewise simultaneously, or subsequently, the filler connection 5 is inserted into the hole which is made in the two foil webs 2a, 2b by the punching device 4, in such a way that it seals tightly the peripheral area of the hole. Then, in accordance with FIG. 3, a further length of the foil tube 2 is drawn off from the supply roll 1 and is placed over the previously drawn off length. In FIG. 3, the bottom foil layer of the additional, drawn off length is denoted with 2c, and the top foil layer is denoted with 2d.

In FIG. 3, 24 denotes an annular welding device which is lowered onto the superposed foil webs 2a, 2b, 2c, 2d so that an annular weld seam which is closed in itself is produced. At the same time, corresponding foil pieces, which are superposed and which are interconnected by the weld seam, are cut out of the superposed foil webs by a cut which is made next to the weld seam outside the area which it encloses. Cutting can be carried out simultaneously by the welding device 24. Finally, the foil tube 2, which is still hanging on the supply roll 1, can be severed from the remaining portion by the cutting device 3.

Figure 4:
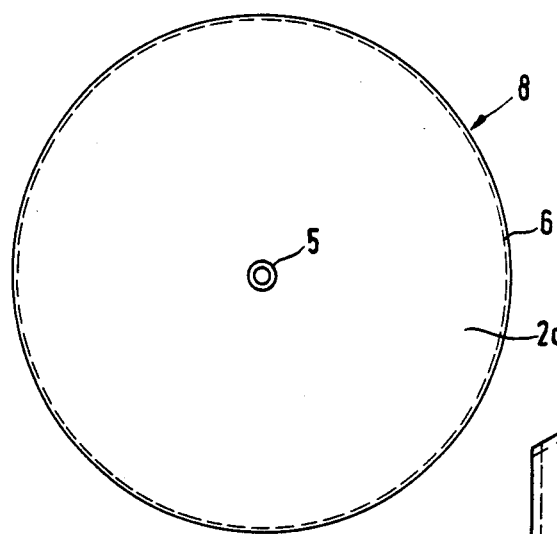
FIG. 4 shows a view from below onto the empty, flat, cut-out and welded foil bag consisting of circular foil pieces.
Figure 4A:
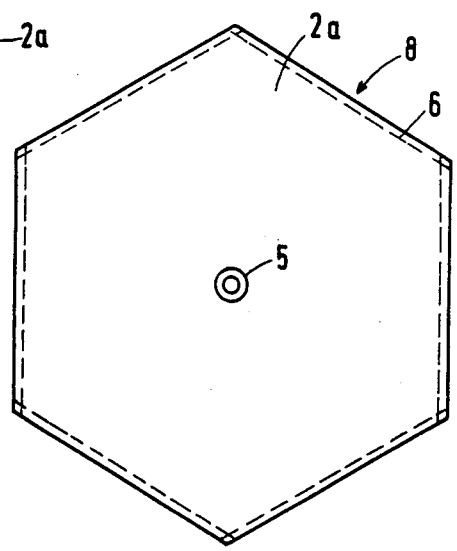
FIG. 4a shows a view as in FIG. 4, although the foil bag consists of hexagonal foil pieces.
Figure 5:
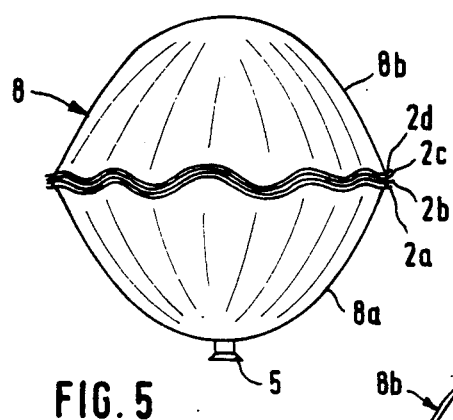
FIG. 5 shows a side view of the inflated foil bag.

FIG. 4 shows the foil bag 8, which is thus completed, from below with a view onto the filler connection 5. Also visible is the lowest foil piece 2a. The weld seam, indicated by dot-dash lines, is denoted with 6. In accordance with FIG. 4a, the foil pieces can also be polygonal, in the present case hexagonal. When the formed body, which is still flat and plane in FIG. 4, is inflated, for example by blowing air into the connecting piece 5, then a spherical balloon, as represented in FIG. 5, is produced. This balloon, which forms the foil bag 8, comprises two foil bag halves 8a and 8b.

Figure 6:
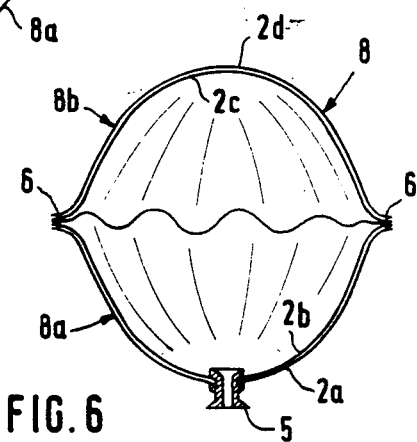
FIG. 6 shows a cross-section through the inflated foil bag.

FIG. 6 shows a section through the inflated foil bag 8 which is represented in FIG. 5. It can be seen that the bottom foil bag half 8a contains the filler connection 5 and is formed by the two foil pieces 2a, 2b, whereas the top foil bag half 8b is formed by the foil pieces 2c, 2d. It can also be seen that the foil pieces 2a, 2b, 2c, 2d are interconnected by the weld seam 6.

The critical points for imperviousness are the weld seam 6 and the connecting area between the connection piece 5 and also the bottom foil bag half 8a. In order to test the imperviousness of these areas, a compressor 11 is connected via a non-return valve 12 and a line 14 with the connecting piece 5 in accordance with FIGS. 9 and 10. A monometer 13 is also connected with the line 14. Inflation of the whole filling bag 8 and also subsequent deaeration, which becomes necessary, would take up unnecessary time. In order to save this time, the foil bag 8 is loaded with a weight 9 which is applied concentrically to the flattened, annular foil bag and which leaves open an annular peripheral area next to the weld seam 6. Furthermore, the weight leaves open a narrow supply channel 10 which leads from the centre enclosing the connecting piece 5 to the annular peripheral area. The compressed air issuing from the compressor 11 can then flow through the connecting piece 5 via the connecting channel 11 into the annular peripheral area and can inflate the same. The remaining area of the foil bag 8 remains flat. The manometer 13 can now be used to determine whether, and how great, a pressure drop occurs over a prescribed period. This pressure drop is a measure for the imperviousness of the weld seam 6 and of the connection between connecting piece 5 and the bottom foil bag half 8a respectively.

Figure 7:
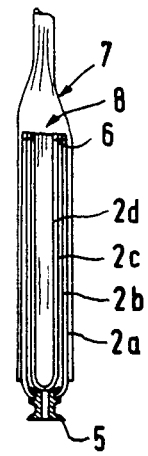
FIG. 7 shows a cross-section through the folded up foil bag which is enclosed by a sheath.
Figure 8:
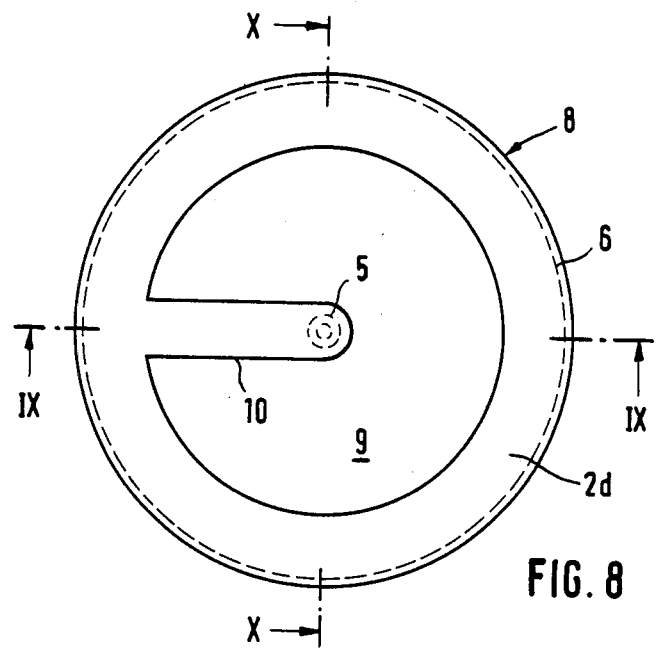
FIG. 8 shows a top plan view of the foil bag which is inflated in an annular peripheral area for the purpose of testing the imperviousness of the weld seam.
Figure 9:
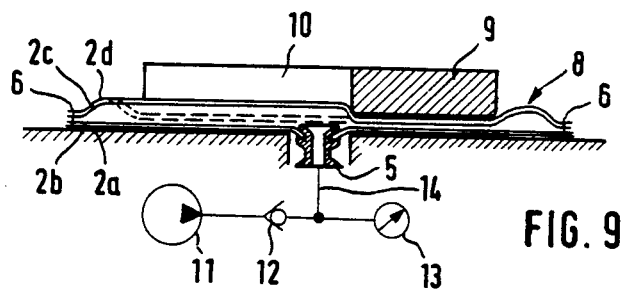
FIG. 9 shows a cross-section IX—IX through FIG. 8 with a device for testing imperviousness.
Figure 10:
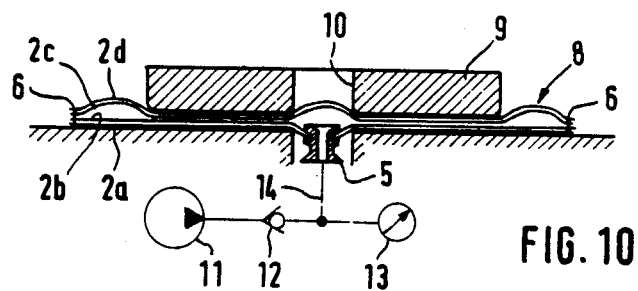
FIG. 10 shows a cross-section X—X through FIG. 8 with the arrangement for testing imperviousness.

After the foil bag 8 has been tested for its imperviousness, then, in accordance with FIG. 7, it is folded up in the manner of an umbrella in such a way that the foil bag half 8b which does not contain the connecting piece 5 is folded into the foil bag half 8a which contains the connecting piece 5. In FIG. 7 this can be seen through the arrangement of the foil pieces 2a, 2b, 2c and 2d. The equator area with the weld seam 6 is disposed at the top. The foil bag 8, which is thus folded up, forms a package of uniform thickness along its length, which is introduced into the cover 7. The manner in which filling and removal of the foil bag 8 from the cover 7 takes place can be seen from FIG. 11, which has already been described.

The quadruple-walled foil bag is produced in exactly the same way as the double-walled foil bag.

We claim:

1. A foil bag for receiving liquid inside a spherical pressure tank provided in collapsed condition, said foil bag comprising two flat disk shaped foil pieces, a seam joining the foil pieces to each other in sealing relationship around their peripheral edges, each foil piece being so shaped and so arranged relative to the other foil piece that when the joined pieces are filled with a liquid inside a spherical tank they conform to the spherical interior shape of the tank, a filling connecting piece penetrating and sealed to one of the foil pieces at the center thereof, the orientation and position of the seam and the filling connecting piece being such that when the foil pieces are folded up in the form of an umbrella inside a cover sheath with the foil piece not provided with a filling connecting piece being inserted into the foil piece provided with the filling connecting piece, the filling connecting piece being disposed at one end of said sheath and the seam being disposed at the other end of said sheath, and the seam being located such that when the foil pieces are filled with a liquid inside a spherical tank, the seam lies in a plane perpendicular to the axis of the filling connecting peace.

2. The foil bag according to claim 1, characterized in that the disc-shaped foil pieces are polygonal.

3. A foil bag according to claim 1, wherein each foil piece comprises a plurality of foil layers, each layer being of the same size and shape and each layer directly overlying the next adjacent and joined thereto around the peripheral edges of the layers.

4. The foil bag according to claim 3, characterized in that the disc-shaped foil pieces are circular.

5. The foil bag according to claim 3, characterized in that the disc-shaped foil pieces are polygonal.

* * * * *